United States Patent [19]

Mizrahi

[11] Patent Number: 6,057,948
[45] Date of Patent: May 2, 2000

[54] PROTECTION SWITCH OPTICAL COMMUNICATIONS SYSTEM

[75] Inventor: Victor Mizrahi, Columbia, Md.

[73] Assignee: Ciena Corporation, Linthicum, Md.

[21] Appl. No.: 08/963,644

[22] Filed: Nov. 3, 1997

[51] Int. Cl.[7] .............................. H04B 10/08; H04J 14/02
[52] U.S. Cl. ........................... 359/110; 359/124; 359/128
[58] Field of Search ..................................... 359/110, 111, 359/124, 127–128, 152

[56] References Cited

U.S. PATENT DOCUMENTS

| | | | |
|---|---|---|---|
| 5,069,521 | 12/1991 | Hardwick ................................. | 359/110 |
| 5,091,796 | 2/1992 | Nishimura et al. ..................... | 359/110 |
| 5,434,691 | 7/1995 | Yamane .................................. | 359/117 |
| 5,457,555 | 10/1995 | Moriyama .............................. | 359/110 |
| 5,510,917 | 4/1996 | Corke et al. ............................ | 359/110 |
| 5,559,622 | 9/1996 | Huber et al. ............................ | 359/110 |
| 5,870,212 | 2/1999 | Nathan et al. .......................... | 359/110 |

FOREIGN PATENT DOCUMENTS

| | | | |
|---|---|---|---|
| 0851704 | 7/1998 | European Pat. Off. . | |
| 0151543 | 8/1984 | Japan .................................... | 359/110 |
| 9608932 | 3/1996 | WIPO . | |
| 9638756 | 12/1996 | WIPO . | |
| 9701907 | 1/1997 | WIPO . | |
| 9725829 | 7/1997 | WIPO . | |

OTHER PUBLICATIONS

Tumolillo, T. A., et al., "Solid State Optical Space Switches For Network Cross–Connect And Protection Applications", IEEE Communications Magazine, vol. 35, No. 2, pp. 124–130, Feb. 1997.

PCT Notification of Transmittal of The International Search Report or the Declaration dated Mar. 17, 1999.

*Primary Examiner*—Kinfe-Michael Negash
*Attorney, Agent, or Firm*—Daniel N. Daisak; David L. Soltz

[57] ABSTRACT

An optical communication system which includes a working communication line for carrying a wavelength division multiplexed signal having N channels and a protection line for carrying the multiplexed signal when the working line is out of service. Optical switches are cascadedly connected along the working and protection lines for providing a reliable and redundant switching configuration while producing less combined crosstalk levels as compared with a single switch configuration.

18 Claims, 4 Drawing Sheets

PROTECTION SWITCH OPTICAL COMMUNICATIONS SYSTEM

FIELD OF INVENTION

The present invention relates to optical communications systems, and more particularly to an optical communication system which provides an optical switching structure for use with a primary transmission line and a protection transmission line for carrying optical communication signals.

BACKGROUND OF INVENTION

In optical transmission systems, a protection line is provided in addition to a working or active line. This is done to provide an alternative path for a communication signal in the event that a fault, such as a fiber break, in the active line compromises the integrity of the transmitted signal. Communication signals sent over these lines typically have high data rates, thereby resulting in the loss of a significant amount of information if a transmission path is inoperative. The use of redundant lines safeguards against this signal loss.

These types of systems typically include an opto-mechanical switch which directs the communication signal along the active line until a fault is detected in which case the protection line is used to carry the signal. FIG. 1 schematically illustrates a particular communication system 10 that includes a transmitter/receiver element 5 for receiving a plurality of optical channels having wavelengths $\lambda_1 \ldots \lambda_N$. Transmitter/receiver element 5 includes an output line 6 for supplying a wavelength division multiplexed (WDM) signal to optical splitter 8 which splits the signal onto outputs 9 and 11 such that the identical WDM signal is received by optical amplifiers 16 and 17. By supplying the same WDM signal to protection line 20, a back-up signal is available in case active transmission line 15 suffers a fault and is unable to carry the signal. An opto-mechanical switch 25 is coupled to terminal 18 associated with active transmission line 15 when the active line is operable. The WDM signal is received at input 32 of a second receiver/transmitter element 30 where each channel from the channel wavelengths $\lambda_1 \ldots \lambda_N$ of the WDM signal are selected and supplied to respective outputs $35^1 \ldots 35_N$. When active line 15 is functioning, the WDM signal supplied to protection transmission line 20 is not utilized and is terminated at terminal 19.

If a fault is detected on line 15 preventing transmission of the WDM signal thereon, switch 25 connects to terminal 19 of transmission line 20, as referenced by the dotted line associated with switch 25, thereby completing the transmission circuit from transmitter/receiver 5 to transmitter/receiver 30. In this situation, the WDM signal supplied to line 20 from receiver/transmitter 5 by way of splitter 8 is carried to input 32 of second receiver/transmitter element 30 where each channel from the channel wavelengths $\lambda_1 \ldots \lambda_N$ of the WDM signal are selected and supplied to respective outputs $35_1 \ldots 35_N$.

An opto-mechanical switch 25 may provide low cross-talk or signal leakage to element 30 as well as low insertion loss as compared with other switching elements. However, mechanical switches such as switch 25, are inherently unreliable in high data rate communication systems. Another drawback associated with this type of system is that the switch provides a single point of failure with no redundancy so that if switch 25 malfunctions, the communication signals carried on the active line 15 and/or protection line 20 will be successfully received by transmitter/receiver 30. Moreover, splitter 8 introduces an additional 3 dB of optical power loss into system 10, thereby decreasing the optical power of the signals transmitted on lines 15 and 20.

Therefore, an optical communication transmission system is needed which provides a reliable and redundant switching configuration as well as providing acceptable cross-talk levels.

SUMMARY OF INVENTION

Accordingly, the present invention meets these needs and avoids the drawbacks associated with other systems by providing a communication system with a working and a protection transmission line that includes a reliable and redundant switching configuration. A communication system is provided that includes a first transmission line for carrying a wavelength division multiplexed optical communication signal having N channels and a second transmission line configured to carry the wavelength division multiplexed signal when the first transmission line is not operative. A first optical switch is connected along the first transmission line having a transmit position and a nontransmit position. A second optical switch is cascadedly connected to the first optical switch along the first transmission line where the second optical switch also has a transmit position and a nontransmit position. The cascaded configuration of the first and second switches provides a crosstalk level which is less than the crosstalk level associated with the first switch or the second switch.

The foregoing, and other features and advantages of the present invention, will be apparent from the following description, the accompanying drawings and the appended claims.

DETAILED DESCRIPTION

In accordance with the present invention, a working transmission line and a protection line are included in an optical communications system with redundant signal routing. The protection transmission line is provided for carrying a communication signal in the event that the working transmission line is not operating. A redundant optical switching configuration is employed to avoid transmission problems associated with single point failures.

Figure 1:
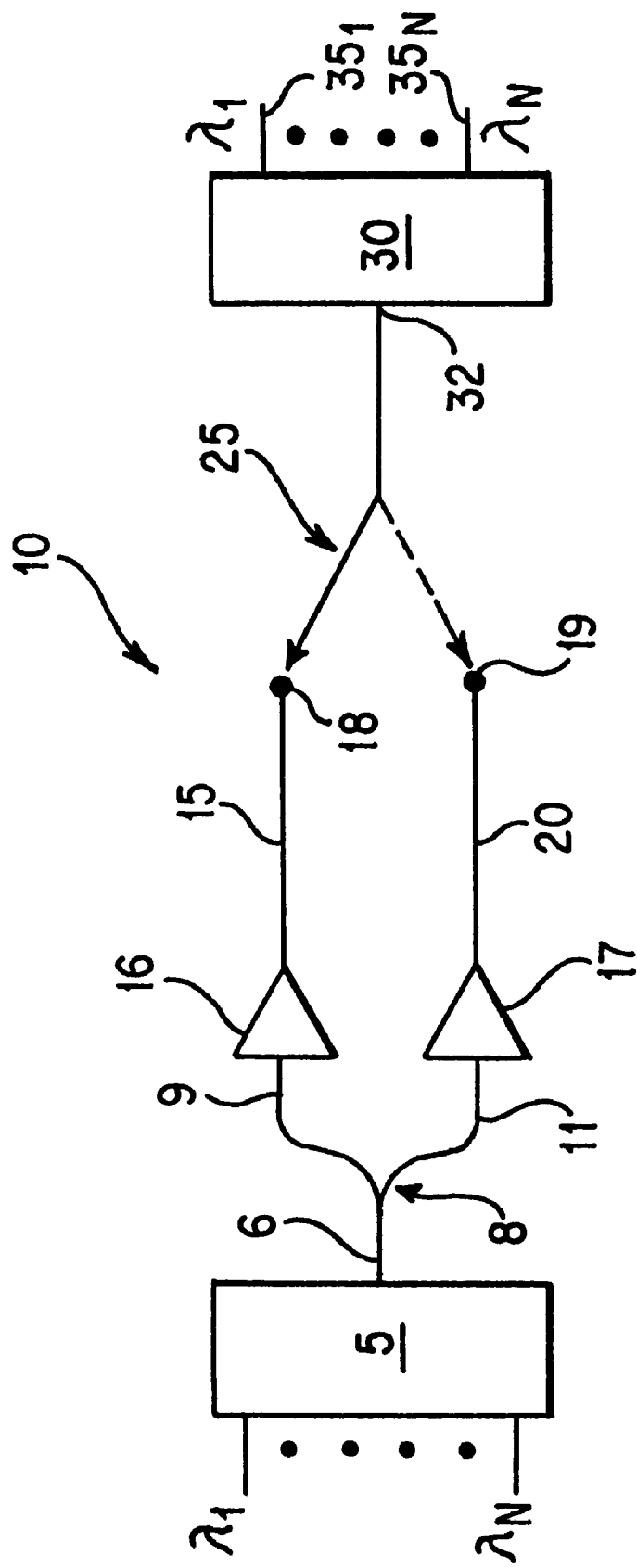
FIG. 1 is a schematic view of a prior art transmission system employing a mechanical switching device.
Figure 2A:
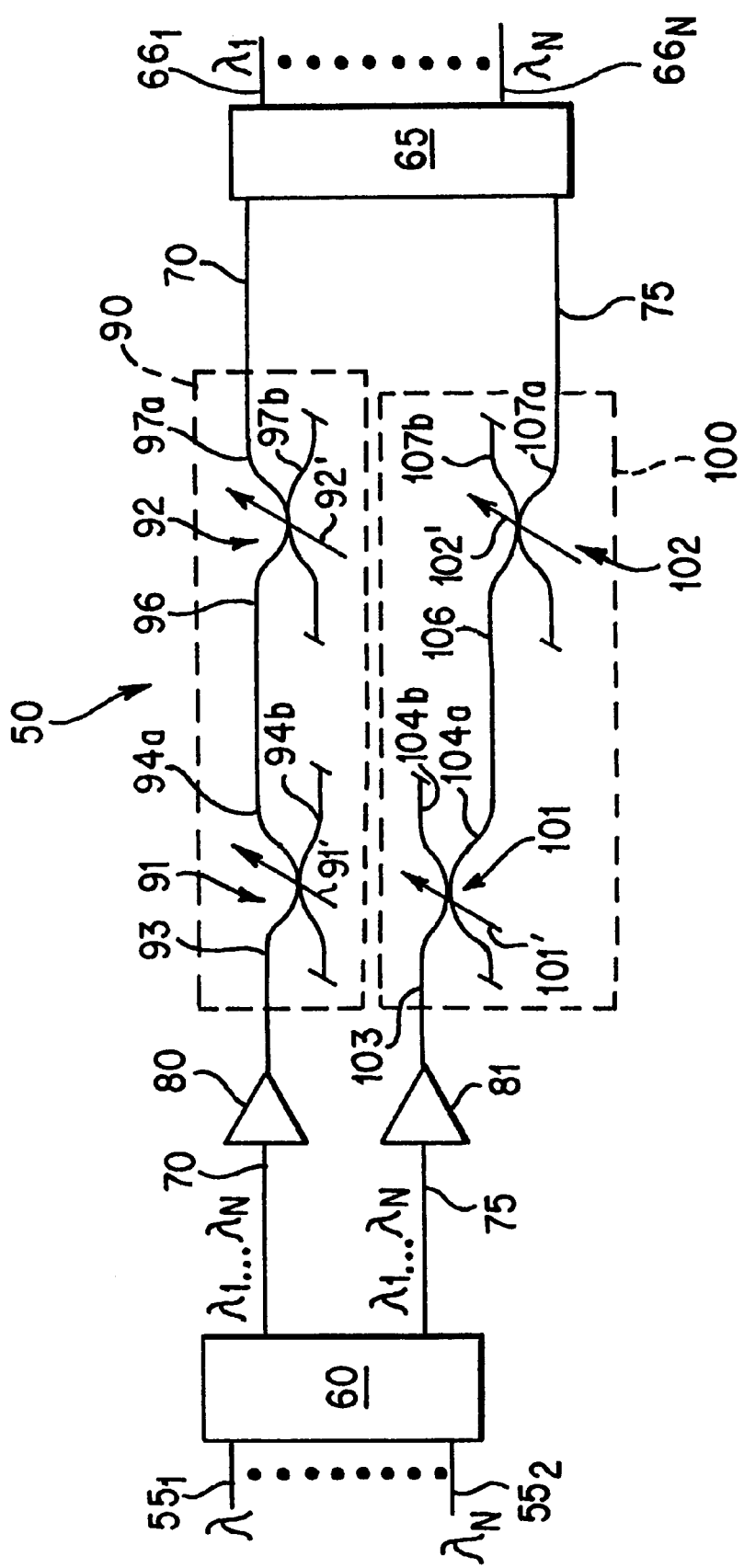
FIG. 2A is a schematic view of a communications system in accordance with the present invention.

FIG. 2A schematically illustrates an embodiment of a simplified communications system 50 in accordance with the present invention. A transmitter/receiver element 60, such as an N×2 optical multiplexer, receives N optical channels having wavelengths $\lambda_1 \ldots \lambda_N$ on input lines $55_1 \ldots 55_N$ and outputs a wavelength division multiplexed optical signal onto working transmission line 70 and protection transmission line 75. The number of optical channels N can be for example, 8, 16, 40, etc. consistent with the number of optical channels included in a WDM optical communication signal. A second receiver/transmitter element 65 receives the WDM optical communication signal from transmitter/receiver element 60 by way of either working line 70 or protection line 75 depending on the fault status of working line 70. The primary transmission line for carrying the WDM signal in system 50 is working line 70. Protection line 75 is used as a redundant route if a fault is detected on line 70 which prevents signal transmission such as a break or component malfunction.

Transmitter/receiver element 60 can serve as a single light source for outputting a WDM signal onto lines 70 and 75 such that channel wavelengths $\lambda_1 \ldots \lambda_N$ are supplied to both transmission lines 70 and 75. In this manner, the same WDM optical signal is carried by lines 70 and 75 thereby providing sufficient redundancy for system 50. Transmitter/receiver element 60 can be coupled to one or more amplifiers 80 and 81 to amplify the WDM signal during transmission along paths 70 and 75, respectively.

A first switching subsystem 90 is coupled to amplifier 80 along working line 70. Switching subsystem 90 includes a first switch 91, for example a 2×2 optical coupler, coupled to a second switch 92, for example a 2×2 optical coupler, in a cascaded configuration. Likewise, a second switching subsystem 100 coupled to amplifier 81 along protection transmission line 75 includes a third switch 101, for example a 2×2 coupler, coupled to a fourth switch 102, for example a 2×2 optical coupler, in a cascaded configuration. Alternatively, switches 91, 92, 101, and 102 can be 1×2 optical couplers. Each switch 91, 92, 101 and 102 has cross-talk associated with it of approximately −20 dB. Although −20 db of crosstalk is often acceptable if incoherent, the requirements are more stringent when the crosstalk is coherent. The use of a common light source included, for example, at transmitter/receiver 60 ensures that the crosstalk is coherent. Accordingly, the cascaded configuration of switches 91 and 92 included in subsystem 90 as well as switches 101 and 102 included in subsystem 100 provides an acceptable −40 dB of cross-talk.

Although the cascaded switching configuration in accordance with the present invention can be used with any on/off switching device which suffers from signal leakage, one type of switch that can be employed as switches 91, 92, 101 and 102 are optical couplers each including a latching actuator indicated by references 91', 92', 101' and 102', respectively. When a latching actuator is engaged, it moves or bends the associated switch to prevent light from passing or allows light to pass to its respective outputs. These types of optical switches are commercially available from Opti Video. Another type of 2=2 optical coupler that may be employed as switches 91, 92, 101, and 102 is available from FDK Corporation which has an associated crosstalk value of −25 dB.

If working line 70 is functioning properly (e.g., no breaks in line 70 have been detected), input port 93 of switch 91 receives the WDM signal from working line 70 and the signal is directed to output 94a. The WDM signal is received by input port 96 of switch 92 and is supplied to its output port 97a. The WDM signal continues to receiver/transmitter element 65 by way of working line 70 where each channel wavelength $\lambda_1 \ldots \lambda_N$ is separated onto output lines $66_1 \ldots 66_N$. Because the redundancy of protection line 75 is not utilized when working line 70 is functioning properly, the WDM signal received on protection line 75 from transmitter/receiver element 60 is prevented from continuing through subsystem 100. This can be done by engaging either switch 101 and/or 102 to terminate the WDM signal. In the instance where optical switches 101 and 102 are optical couplers having latching actuators 101' or 102', respectively, the moving or bending of latching actuators 101' and/or 102' forwards the WDM signal, for example, to either reflected port 104b of coupler 101 or port 107b of coupler 102. In either instance, transmitter/receiver element 65 receives a WDM signal via working line 70 and no additional signal is received by element 65 via protection line 75. In addition, the cascaded connection configuration of switches 91 and 92 associated with subsystem 90 as well as the cascaded connection of switches 101 and 102 associated with subsystem 100 provides multiple switching points in system 50, thereby avoiding single point failure configurations associated with single switch systems.

If a fault in line 70 is detected, subsystem 90 prevents the WDM signal from being carried, via line 70, to transmitter/receiver 65. This can be done by either engaging latching actuator 91' or 92' associated with optical switches 91 and 92, respectively. For example, by engaging latching actuator 91', the WDM signal is directed to reflected output port 94b where the signal is essentially terminated. Similarly, the WDM signal may also be terminated along line 70 by engaging latching actuator 92' associated with switch 92, thereby directing the WDM signal to reflected output port 97b.

If protection line 75 is utilized for transmission of the WDM signal having channel wavelengths $\lambda_1 \ldots \lambda_N$, switching subsystem 100 receives the WDM signal on line 75 by way of input port 103 of switch 101. Latching actuator 101' of switch 101 is engaged in order to allow the WDM signal to be supplied to output port 104a. Likewise, input 106 of switch 102 receives the WDM signal from output 104a and supplies the signal to its output 107a coupled to transmitter/receiver element 65 via protection transmission line 75. In this manner, transmitter/receiver element 65 receives the WDM signal via protection line 75 and no additional signal is received via working line 70. The WDM signal is supplied to transmitter/receiver element 65 by way of protection line 75 where each channel wavelength $\lambda_1 \ldots \lambda_N$ is separated onto output lines $66_1 \ldots 66_N$.

Figure 2B:
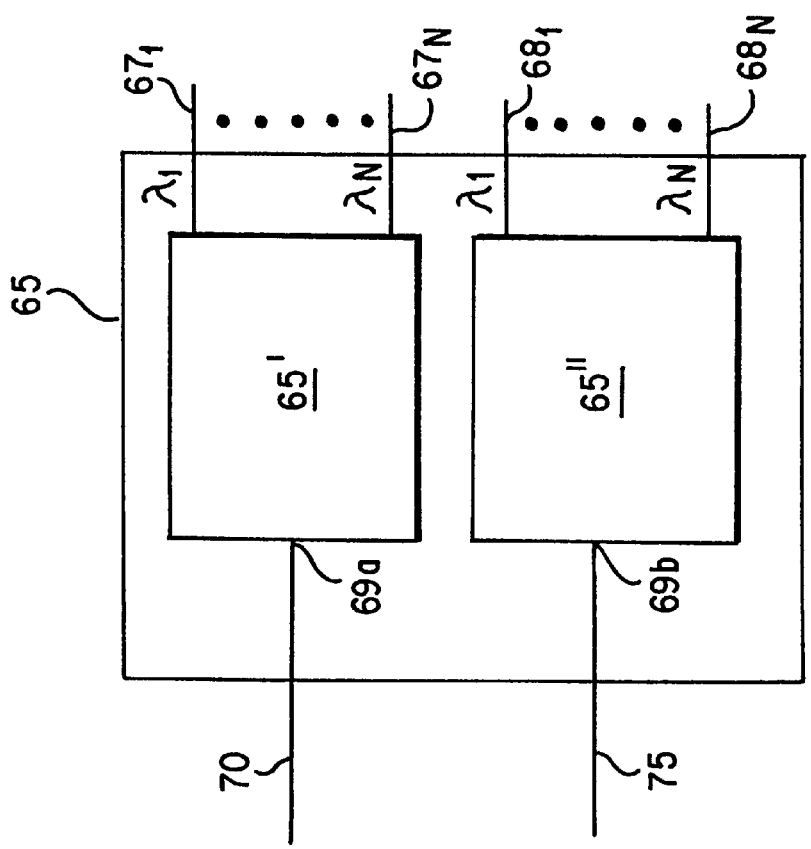
FIG. 2B is a schematic view of an alternative configuration of the transmitter/receiver element shown with reference to FIG. 2A in accordance with the present invention.

FIG. 2B schematically illustrates an alternative embodiment of transmitter/receiver element 65 shown in FIG. 2A which includes a first 1×N demultiplexer 65' coupled to line 70 at input 69a and a second 1×N demultiplexer 65" coupled to line 75 at input 69b. If working line 70 is used as the transmission path, demultiplexer 65' receives the WDM signal and separates the channels having wavelengths $\lambda_1 \ldots \lambda_N$ onto outputs $67_1 \ldots 67_N$. If protection line 75 is used as the transmission path, demultiplexer 65" receives the WDM signal and separates the channels having wavelengths $\lambda_1 \ldots \lambda_N$ onto outputs $68_1 \ldots 68_N$, respectively.

Figure 3B:
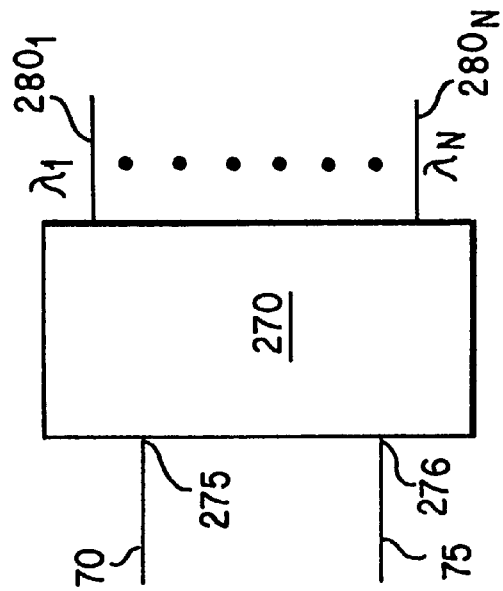
FIG. 3B is a schematic view of an alternative configuration of the transmitter/receiver elements shown with reference to FIG. 3A.
Figure 3A:
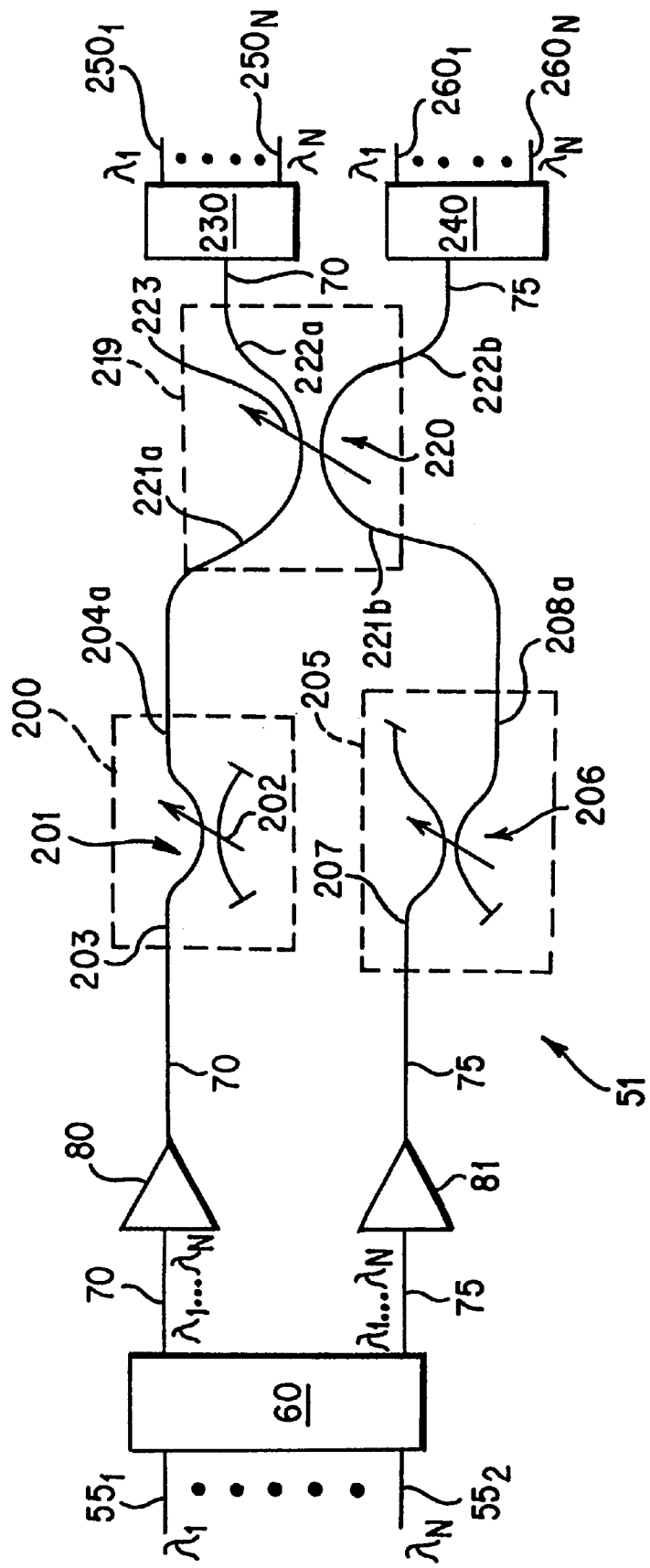
FIG. 3A is a schematic view of an alternative embodiment of the communications system in accordance with the present invention.

FIG. 3A schematically illustrates an alternative embodiment of communications system 51 in accordance with the present invention where a shared optical switch 219 communicates with working transmission line 70 and protection transmission line 75. In this embodiment, a fewer number of switches are employed as compared with the system of FIG. 2A while still retaining the benefits of the cascaded switching configuration. In communications system 51', transmitter/receiver element 60 receives N optical channels having wavelengths $\lambda_1 \ldots \lambda_N$ on input lines $55_1 \ldots 55_N$ and outputs a WDM signal onto working transmission line 70 and protection transmission line 75. First switch 200 can include, for example, a 2×2 optical coupler 201 having a latching actuator referenced at 202. Switch 200 receives the WDM signal at input port 203 and, if working transmission line 70 is functioning properly, supplies the WDM signal to shared switch 219. Shared switch 219 can include, for example, a 2×2 optical coupler 220 having input 221a which receives the WDM signal from output 204a of switch 200. Alternatively, a 1×2 coupler can be used as switch 200 and a 2×1 coupler can be used as shared switch 219. Switch 219 supplies the WDM signal to output 222a which is coupled to receiver/transmitter element 230 at input line 231. Receiver/transmitter element 231 can be, for example, a 1×N demultiplexer. Each channel of the WDM signal having channel wavelengths $\lambda_1 \ldots \lambda_N$ are output onto a respective port $250_1 \ldots 250_N$ of transmitter/receiver element 230, thereby providing a transmission path from transmitter/receiver 60 to transmitter/receiver 230 via working line 70.

If a fault is detected in working transmission line 70, the WDM signal on line 70 may be terminated at either switch 200 and/or 219 by engaging latching actuators 202 or 223 associated with optical couplers 201 and 220, respectively. In this situation, protection line 75 supplies the WDM signal having channel wavelengths $\lambda_1 \ldots \lambda_N$ from transmitter/receiver element 75 to receiver/transmitter element 240 by way of switches 205 and 219. Optical switch 205 can include, for example, a 2×2 optical coupler 206 which receives the WDM signal at input port 207 from line 75 and supplies it to input port 221b of switch 219 via output 208a. In this manner, switches 200 and 205 are connected to shared switch 220 in a cascaded configuration thereby producing an acceptable −40 dB of cross-talk. Alternatively, switch 205 can also be a 1×2 optical coupler. The latching actuator, referenced at 223, associated with coupler 220 is moved or bent in order to direct the WDM signal received at input 221b to output 222b. Output 222b is coupled to transmitter/receiver element 240 at input line 241. Transmitter/receiver element 240 can be, for example, a 1×N demultiplexer where each channel in the WDM signal is supplied to respective outputs $260_1 \ldots 260_N$. In this manner, a transmission path is provided for the WDM signal from transmitter/receiver element 60 to transmitter/receiver element 240 along protection line 75 via optical switches 205 and 219 when working transmission line 70 experiences a fault preventing transmission thereon. Moreover, the cascaded arrangement of switches 200 and 205 with shared switch 219 provides a redundant switching configuration to protect against single point failure switching systems.

As schematically illustrated in FIG. 3B, a 2×N transmitter/receiver element, such as a 2×N demultiplexer 270, can replace transmitter/receiver elements 230 and 240. Transmitter/receiver 270 receives the WDM signal having N optical channels $\lambda_1 \ldots \lambda_N$ at inputs 275 or 276 from shared optical switch outputs 222a and 222b by way of lines 70 and 75, respectively depending on which of the transmission lines is carrying the WDM signal. The latching actuator, referenced at 223, associated with shared switch 219 determines which of outputs 222a and 222b supplies the WDM signal to either input 275 or 276. The 2×N demultiplexer 270 receives the WDM signal at input 275 or 276 and separates each channel wavelength $\lambda_1 \ldots \lambda_N$ so that a each output $280_1 \ldots 280_N$, respectively receives a particular channel wavelength.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical communication system comprising:
   a first transmission line for carrying a wavelength division multiplexed optical communication signal having N channels;
   a second transmission line configured to carry said wavelength division multiplexed signal when said first transmission line is not operative;
   a first optical switch connected along said first transmission line having a transmit position and a nontransmit position; and
   a second optical switch cascadedly connected to said first optical switch along said first transmission line, said second optical switch having a transmit position and a nontransmit position, said first optical switch includes an output having an associated first crosstalk level, said second optical switch including an output having an associated second crosstalk level, said second crosstalk level being less than said first crosstalk level.

2. The optical communication system in accordance with claim 1 further comprising a third optical switch connected along said second transmission line having a transmit position and a nontransmit; and
   a fourth optical switch cascadedly connected to said third optical switch along said second transmission line, said fourth optical switch having a transmit position and a nontransmit position.

3. The optical communication system in accordance with claim 2 wherein said third optical switch includes an output having an associated third crosstalk level and said fourth optical switch including an output having an associated fourth crosstalk level, said fourth crosstalk level being less than said third crosstalk level.

4. The optical communication system in accordance with claim 2 further comprising an N channel demultiplexer having a first and second inputs and N outputs, said first demultiplexer input coupled to said second switch, said second demultiplexer input coupled to said fourth switch, each of said demultiplexer outputs carrying one of said N optical channels.

5. The optical communication system in accordance with claim 2 further comprising an N channel demultiplexer having an input and N outputs, said demultiplexer input coupled to said fourth switch, each of said N demultiplexer outputs carrying one of said N optical channels.

6. The optical communication system of claim 2 wherein said third and fourth optical switches are optical couplers having respective latching actuators configured to adjust each of said couplers into a transmit position or a nontransmit position.

7. The optical communication system in accordance with claim 1 further comprising an N channel demultiplexer having an input and N outputs, said demultiplexer input coupled to said second switch, each of said N demultiplexer outputs carrying one of said N optical channels.

8. The optical communication system in accordance with claim 1 further comprising a first multiplexer having N inputs for receiving said N optical channels, said multiplexer having a first output coupled to said first transmission line and a second output coupled to said second transmission line.

9. The optical communication system in accordance with claim 1 wherein said first and second optical switches are optical couplers having respective latching actuators configured to adjust each of said couplers into a transmit position or a nontransmit position.

10. A communication system comprising:
    a first optical transmission line carrying a wavelength division multiplexed optical signal having N optical channels;
    a first optical switching element connected along said first transmission line;

a second optical transmission line for carrying said wavelength division multiplexed optical signal;

a second optical switching element connected along said second transmission line;

a shared optical switching element having a first input coupled to said first switching element, said shared switching element having a second input coupled to said second switching element, said first optical switching element includes an output having an associated first crosstalk level, said second optical switching element including an output having an associated second crosstalk level, said shared optical switching element including an output having a third crosstalk level, said third crosstalk level being less than said first crosstalk level or said second crosstalk level.

11. The optical communication system in accordance with claim 10 wherein said shared switching element includes a first output coupled to a first transmitter/receiver element a second output coupled to a second transmitter/receiver element.

12. The optical communication system in accordance with claim 11 wherein said first transmitter/receiver element is an N channel demultiplexer having an input coupled to said first output of said shared switching element and N outputs, each of said outputs carrying one of said N optical channels.

13. The optical communication system in accordance with claim 11 wherein said second transmitter/receiver element includes an N channel demultiplexer having an input coupled to said second output of said shared switching element and N outputs, each of said outputs carrying one of said N optical channels.

14. The optical communication system in accordance with claim 10 further including a multiplexer having N inputs for receiving N optical channels, said multiplexer having a first output coupled to said working transmission line for outputting said wavelength division multiplexed optical communication signal having N channels, and a second output optically coupled to said protection transmission line for outputting said wavelength division multiplexed optical communication signal.

15. The optical communication system in accordance with claim 10 wherein said shared switching element includes a first and second outputs, each of said outputs coupled to respective inputs of an N channel demultiplexer having N outputs, each of said outputs carrying one of said N optical channels.

16. The optical communication system in accordance with claim 10 wherein said first optical switching element is an optical coupler having a latching actuator for bending each of said couplers in a transmit position and a nontransmit position.

17. The optical communication system in accordance with claim 10 wherein said second optical switching element is an optical coupler having a latching actuator for bending said coupler in a transmit position and a nontransmit position.

18. The optical communication system in accordance with claim 10 wherein said shared optical switching element is an optical coupler having a latching actuator for bending said coupler in a transmit position and a nontransmit position.

* * * * *